US011928700B2

(12) United States Patent
Choi et al.

(10) Patent No.: US 11,928,700 B2
(45) Date of Patent: Mar. 12, 2024

(54) SMART FARM PLATFORM

(71) Applicant: LG ELECTRONICS INC., Seoul (KR)

(72) Inventors: Younsung Choi, Seoul (KR); Eunjung Lee, Seoul (KR); Kangseong Lee, Seoul (KR); Takashi Morimoto, Seoul (KR); Masako Ikeda, Seoul (KR); Hiromu Imanishi, Seoul (KR); Masami Yokota, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 207 days.

(21) Appl. No.: 17/127,114

(22) Filed: Dec. 18, 2020

(65) Prior Publication Data

US 2021/0192556 A1 Jun. 24, 2021

(30) Foreign Application Priority Data

Dec. 20, 2019 (KR) .......................... 10-2019-0171765

(51) Int. Cl.
*A01G 7/04* (2006.01)
*G06Q 30/0201* (2023.01)
*G06Q 30/0283* (2023.01)
*G06Q 50/02* (2012.01)
*G06T 7/00* (2017.01)

(52) U.S. Cl.
CPC ......... *G06Q 30/0206* (2013.01); *A01G 7/045* (2013.01); *G06Q 30/0283* (2013.01); *G06Q 50/02* (2013.01); *G06T 7/0012* (2013.01); *G06T 2207/30188* (2013.01)

(58) Field of Classification Search
CPC ..... G06Q 30/0283; G06Q 50/02; A01G 7/045
USPC .................................. 705/7.35, 315; 701/50
See application file for complete search history.

(56) References Cited

U.S. PATENT DOCUMENTS

| 7,792,762 B2 * | 9/2010 | Podgurny | G06Q 10/08 |
| | | | 705/1 |
| 2003/0195822 A1 * | 10/2003 | Tatge | G06Q 40/04 |
| | | | 705/26 |
| 2005/0044012 A1 * | 2/2005 | Huang | G06Q 10/06 |
| | | | 705/28 |

(Continued)

FOREIGN PATENT DOCUMENTS

KR 10-1723173 B1 4/2017
KR 10-2019-0011121 A 2/2019

OTHER PUBLICATIONS

Recipes for home-grown fruit and vegetables by Thompson & Morgan, dated Sep. 27, 2016 https://web.archive.org/web/20160927193013/http://www.thompson-morgan.com:80/recipes-for-fruit-and-vegetables (Year: 2016).*

(Continued)

*Primary Examiner* — Rupangini Singh
(74) *Attorney, Agent, or Firm* — Birch, Stewart, Kolasch & Birch, LLP

(57) ABSTRACT

A smart farm platform is disclosed for determining recommended selling prices of agricultural products based on state information of the agricultural products and operation history information of a plant grower, among information received from the plant grower, and a terminal displays the recommended selling prices of agricultural products through a display.

3 Claims, 7 Drawing Sheets

(56) References Cited

U.S. PATENT DOCUMENTS

| | | | |
|---|---|---|---|
| 2009/0017885 A1* | 1/2009 | Halls | A01F 12/18 460/59 |
| 2014/0176705 A1* | 6/2014 | Ibamoto | H04N 5/23229 348/135 |
| 2015/0012370 A1* | 1/2015 | Stevenson | G06Q 30/0623 705/14.27 |
| 2015/0351320 A1* | 12/2015 | Takahara | A01D 41/127 701/50 |
| 2017/0270446 A1* | 9/2017 | Starr | G06Q 10/06313 705/7.13 |
| 2018/0184600 A1* | 7/2018 | Charling | A01G 25/167 700/284 |
| 2019/0050948 A1* | 2/2019 | Perry | G06Q 50/02 |
| 2019/0191639 A1* | 6/2019 | Hegyi | A01G 9/20 |
| 2019/0325467 A1* | 10/2019 | Perry | G06Q 30/0206 705/37 |
| 2020/0037522 A1* | 2/2020 | DeJarnette | A01G 27/003 700/248 |
| 2020/0037524 A1* | 2/2020 | Friedman | A01G 31/047 |
| 2020/0320716 A1* | 10/2020 | O'Neill | G06T 7/20 382/103 |
| 2020/0344965 A1* | 11/2020 | Song | A01G 27/003 47/66.5 |
| 2020/0380438 A1* | 12/2020 | Briggs | A01G 9/0295 |
| 2021/0084836 A1* | 3/2021 | Hunter | A01G 9/16 |
| 2021/0392834 A1* | 12/2021 | Rouxel | A01G 9/022 |
| 2022/0053715 A1* | 2/2022 | Shay | A01G 31/02 47/62 C |
| 2023/0157215 A1* | 5/2023 | Lee | A01G 7/045 362/231 |

OTHER PUBLICATIONS

Matthew Lynley, "iUNU aims to build cameras on rails for growers to keep track of their crop health" https://web.archive.org/web/20171114181657/https://techcrunch.com/2017/11/14/iunu-aims-to-build-cameras-on-rails-for-growers-to-keep-track-of-their-crop-health/ (Year: 2017).*

* cited by examiner

SMART FARM PLATFORM

CROSS-REFERENCE TO RELATED APPLICATION

This application claims the priority benefit of Korean Patent Application No. 10-2019-0171765 filed in the Republic of Korea on Dec. 20, 2019, the disclosure of which is incorporated herein by reference in its entirety.

BACKGROUND

Field of the Invention

The present disclosure relates to a smart farm platform and an operation method thereof, and more particularly to a smart farm platform capable of interconnecting a producer who grows agricultural products using a plant grower and a consumer and an operation method thereof.

Discussion of the Related Art

Modern people who are greatly concerned about healthy food have felt mental satisfaction in direct cultivation of a vegetable garden and harvesting. As a result, a plant grower for home use capable of growing plants for self-sufficiency, such as vegetables, or decorative plants has been developed.

In addition, the number of producers who wish to sell surplus agricultural products, among agricultural products produced using plant growers, and consumers who wish to directly confirm and purchase small-scale organic agricultural products has increased.

Efforts to optimize production and consumption of agricultural products in local units to thus reduce generation of food waste while supplying good ingredients in a timely manner have also increased.

Meanwhile, innovations using information and communication technology (ICT) have been attempted in agriculture. Research on a smart farm, which is an intelligent agricultural system based on information and communication technology in production, processing, and distribution of agricultural products, has been increasingly conducted.

Korean Patent Application Publication No. 10-2019-011121 discloses an online agricultural product wholesale auction platform and a transaction method using the same, where interconnection between a purchaser and a seller, sales, payment, and delivery are supported.

Korean Registered Patent Publication No. 10-1723173 discloses an ICT-based agricultural product management and production system, wherein information about a raw material supplier, an agricultural product producer, an infrastructure operator, and a distribution manager are collected to supply cultivars of agricultural products, production timing of the agricultural products, and management information of the agricultural products and to share distribution information of the agricultural products.

However, these technologies are provided for professional agricultural companies, associations, and merchants, and it is still difficult for small-scale producers to utilize the technologies. In addition, these technologies collect crop information of plants using agricultural products and plant growers, but they do not recommend or automatically determine prices of the agricultural products (i.e., crops or plants) based on the collected information. It is difficult to predict the harvest timing of agricultural products, and the amount of agricultural products that are harvested, as the amount of supply of agricultural products frequently increases and decreases. Consequently, it is not easy to decide prices of agricultural products.

SUMMARY

An object of the present disclosure is to provide a smart farm platform capable of interconnecting a producer who grows agricultural products and a consumer and an operation method thereof.

Another object of the present disclosure is to provide a smart farm platform capable of automatically recommending or deciding agricultural product information using information collected by a plant grower and an operation method thereof.

Another object of the present disclosure is to provide a smart farm platform capable of variously using information collected by a plant grower and an operation method thereof.

A further object of the present disclosure is to provide a smart farm platform capable of minimizing generation of agricultural product waste and food waste and an operation method thereof.

In accordance with the present disclosure, the above and other objects can be accomplished by the provision of a smart farm platform including a plant grower configured to produce agricultural products, a business platform configured to receive information about the agricultural products and the plant grower from the plant grower, and a terminal connected to the business platform, the terminal being configured to request predetermined information related to the agricultural products and to display a screen based on a reply received from the business platform in response to the request through a display, wherein the business platform decides recommended selling prices of the agricultural products based on state information of the agricultural products and operation history information of the plant grower, among the information received from the plant grower, and the terminal displays the recommended selling prices of the agricultural products through the display.

The business platform may decide the recommended selling prices based on production costs calculated based on the operation history information of the plant grower or production costs input through a producer-side terminal of a producer who uses the plant grower.

The business platform may calculate the production costs based on information about at least one of amounts of water, electricity, and supplies used by the plant grower.

The business platform may include personnel expenses calculated based on manipulation history information of the plant grower and sensing data of the plant grower in the production costs.

The business platform may evaluate states of the agricultural products based on image data of the agricultural products received from the plant grower and decides the recommended selling prices based on the result of evaluation and the production costs.

The business platform may evaluate states of the agricultural products based on image data of the agricultural products received from the plant grower, and the terminal may display the result of evaluation.

The business platform may decide the recommended selling prices based on the amount of production of the agricultural products collected from producer-side terminals and the level of demand for the agricultural products collected from consumer-side terminals.

The business platform may decide the recommended selling prices based on the amount of production of the agricultural products collected from the producer-side terminals in a local area and the level of demand for the agricultural products collected from the consumer-side terminals in the local area.

The business platform may provide information about a delivery path from a seller who uses the plant grower to a consumer who purchases the agricultural product to a consumer-side terminal.

The business platform may predict growth states of the agricultural products based on image data of the agricultural products received from the plant grower.

In the case in which the agricultural products are agricultural products before harvesting, the business platform may predict harvest timing of the agricultural products based on the predicted growth state and may vary timing when a purchase request for the agricultural products is possible based on the predicted harvest timing.

The business platform may predict the maximum amount of production of the agricultural products and the minimum amount of production of the agricultural products based on the predicted growth state and may provide information about the predicted maximum amount of production and the predicted minimum amount of production to the terminal.

The business platform may provide recipe information using the agricultural products based on the predicted growth state.

The business platform may recommend a predetermined cultivar based on at least one of location information of the plant grower, operation history information of the plant grower, and demand information of agricultural products.

The business platform may recommend the predetermined cultivar based on specific cultivar growth information and specific cultivar demand information in a local area from the plant grower.

Upon receiving a final input of the recommended selling prices through a producer-side terminal of a producer who uses the plant grower, the business platform may register prices corresponding to the final input as selling prices of the agricultural products.

In the case in which the terminal is a consumer-side terminal of a consumer who purchases the agricultural products, the recommended selling prices may be the selling prices of the agricultural products.

The terminal may be a producer-side terminal of a producer who uses the plant grower or a consumer-side terminal of a consumer who purchases the agricultural products.

The disposition form of growing panels of the plant grower in a day mode and the disposition form of the growing panels of the plant grower in a night mode may be different from each other.

In the night mode, the growing panels may be disposed so as to face the interior of the plant grower and a lighting bar and a camera sensor in the plant grower may be operated.

BRIEF DESCRIPTION OF THE DRAWINGS

The above and other objects, features and advantages of the present disclosure will be more clearly understood from the following detailed description taken in conjunction with the accompanying drawings.

DETAILED DESCRIPTION OF THE EMBODIMENTS

Hereinafter, embodiments of the present disclosure will be described in detail with reference to the accompanying drawings. However, the present disclosure is not limited to the embodiments described herein, and may be embodied in various different forms.

In order to clearly describe the present disclosure, parts having no relation to the description are omitted from the drawings. Wherever possible, the same reference numbers will be used throughout the drawings to refer to the same or like parts.

It will be understood that, although the terms "first," "second", etc. may be used herein to describe various elements, corresponding elements should not be understood to be limited by these terms, which are used only to distinguish one element from another.

Figure 1:
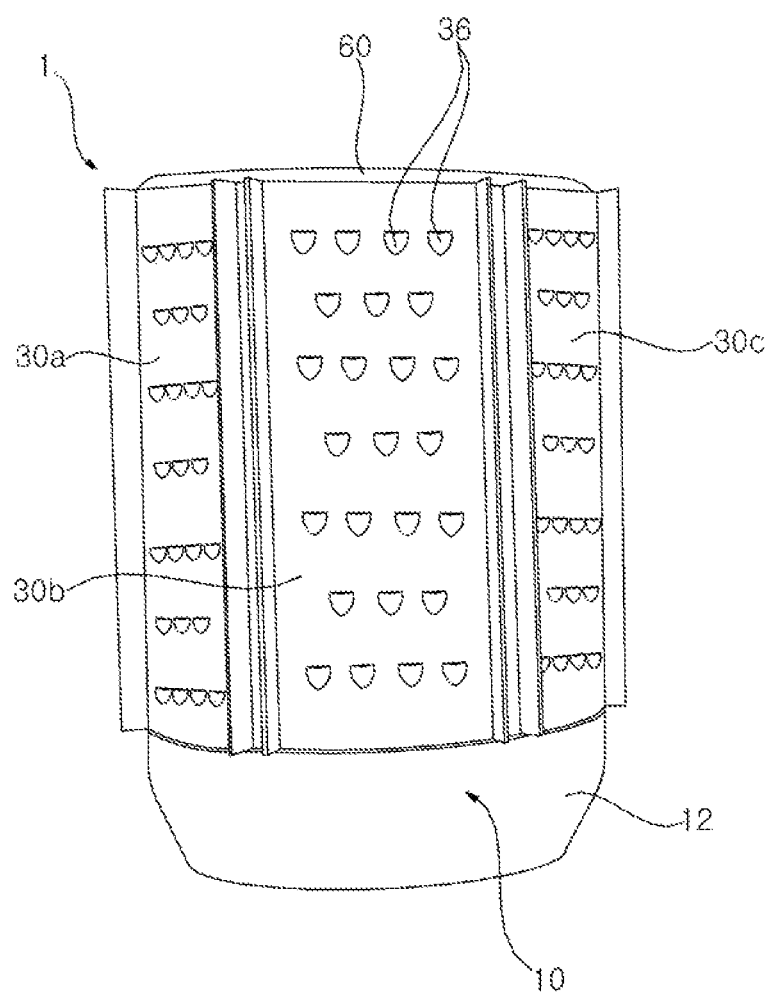
FIG. 1 is a side view showing a plant grower according to an embodiment of the present disclosure in the state in which growing panels are disposed at a second position.
Figure 2:
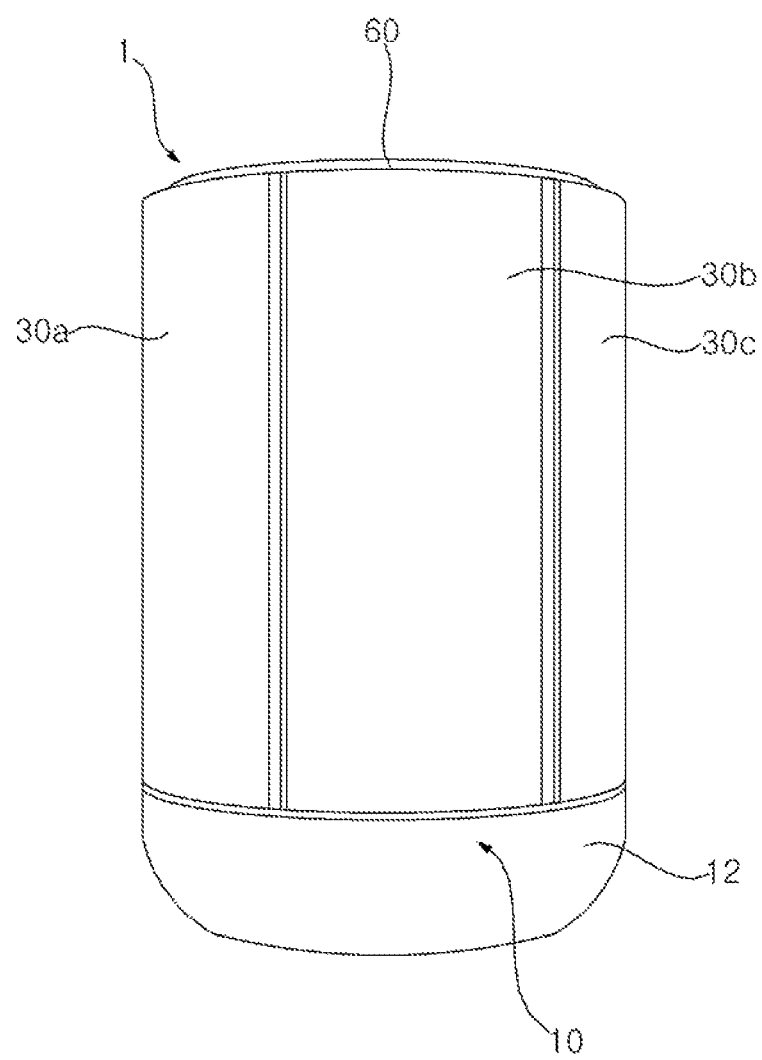
FIG. 2 is a side view showing the plant grower according to an embodiment of the present disclosure in the state in which the growing panels are disposed at a first position.
Figure 3:
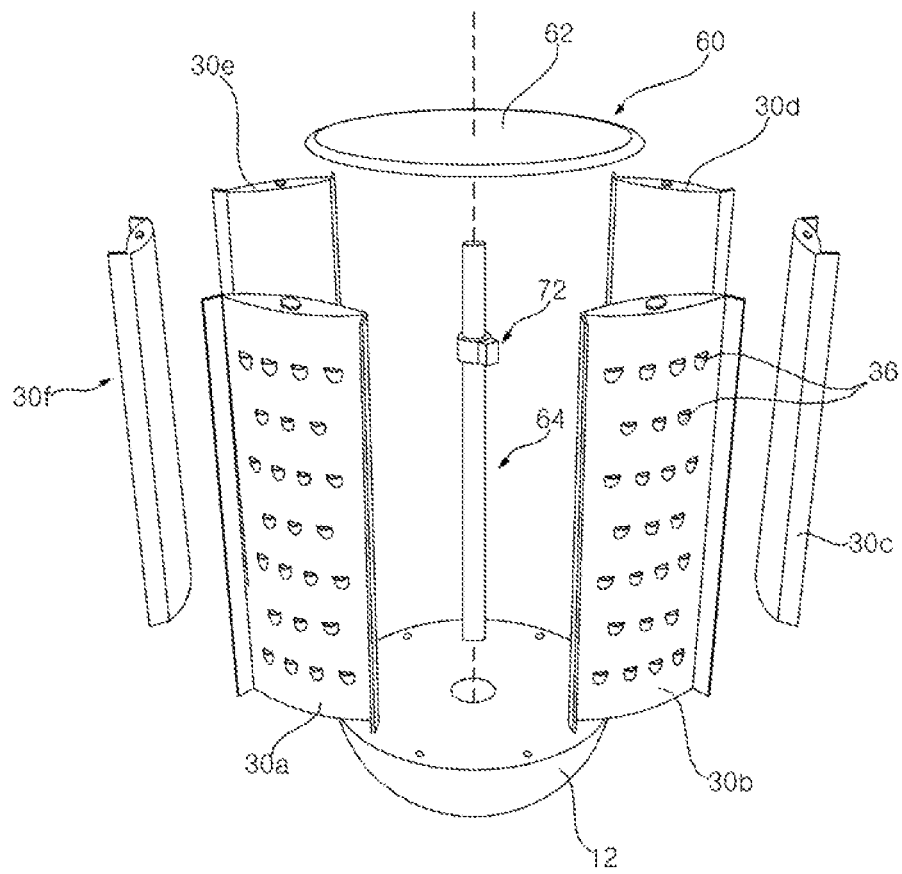
FIG. 3 is an exploded view showing the plant grower according to the embodiment of the present disclosure.

Referring to FIGS. 1 to 3, a plant grower 1 according to the present disclosure includes a base 10, a plurality of growing panels 30a, 30b, 30c, 30d, 30e, and 30f disposed vertically along the circumference of an upper surface of the base 10, the plurality of growing panels 30a, 30b, 30c, 30d, 30e, and 30f being rotatably disposed at the base 10, and an upper cover 60 configured to define a surface parallel to the upper surface of the base 10, the upper cover being disposed above the plurality of growing panels 30a, 30b, 30c, 30d, 30e, and 30f.

The plant grower 1 according to the present disclosure may further include a lighting bar 64 extending vertically upwards from the center of the upper surface of the base 10 to the upper cover 60 (e.g., to a center of the upper cover 60 so as to be disposed at a center of the plant grower 1 as a whole), the lighting bar 64 being configured to emit light toward the plurality of growing panels 30a, 30b, 30c, 30d, 30e, and 30f (e.g., is configured to uniformly emit light toward the plurality of growing panels 30a, 30b, 30c, 30d, 30e, and 30f).

A plurality of growing holders 36, through which a plant to be grown is inserted, is disposed at each of the plurality of growing panels 30a, 30b, 30c, 30d, 30e, and 30f The surface of each of the plurality of growing panels 30a, 30b, 30c, 30d, 30e, and 30f at which the growing holders 36 are disposed may face the lighting bar 64, which is disposed at the center of the base 10, or may face in the direction opposite the lighting bar 64.

The base 10 may rotatably support the plurality of growing panels 30a, 30b, 30c, 30d, 30e, and 30f A space configured to store water to be supplied to the plurality of growing panels 30a, 30b, 30c, 30d, 30e, and 30f may be defined in the base 10.

The plurality of growing panels 30a, 30b, 30c, 30d, 30e, and 30f is rotatably disposed along the circumference of the upper surface of the base 10. Referring to FIG. 3, six growing panels 30a, 30b, 30c, 30d, 30e, and 30f may be disposed along the circumference of the base 10. The number of growing panels 30a, 30b, 30c, 30d, 30e, and 30f may be differently set depending on the size of the base 10 or the width of each of the growing panels.

The plurality of growing panels 30a, 30b, 30c, 30d, 30e, and 30f may be disposed at a first position P1, at which the surfaces thereof at which the growing holders 36 are disposed face the lighting bar 64, and at a second position P2, which has a phase difference of 180 degrees from the first position and at which the surfaces thereof at which the growing holders 36 are disposed face in the direction opposite the lighting bar 64. That is, when the plurality of growing panels 30a, 30b, 30c, 30d, 30e, and 30f is disposed as shown in FIG. 2, the position may be set to the first position P1. When the plurality of growing panels 30a, 30b, 30c, 30d, 30e, and 30f is disposed as shown in FIG. 1, the position may be set to the second position P2.

The upper cover 60 includes a solar panel 62 configured to generate electricity using sunlight.

The solar panel 62 is a kind of solar cell configured to convert solar energy of sunlight into electrical energy. The solar panel 62 uses a P-type semiconductor and an N-type semiconductor, and generates electricity in a manner in which, when light is emitted, an electric charge moves therein, whereby a potential difference is generated between a P pole and an N pole. The solar panel 62 may be manufactured in the form of a panel in which one or more solar cells are connected to each other.

The solar panel 62 may be electrically connected to a battery disposed in the base 10. The solar panel 62 may store generated electrical energy in the battery.

Figure 4:
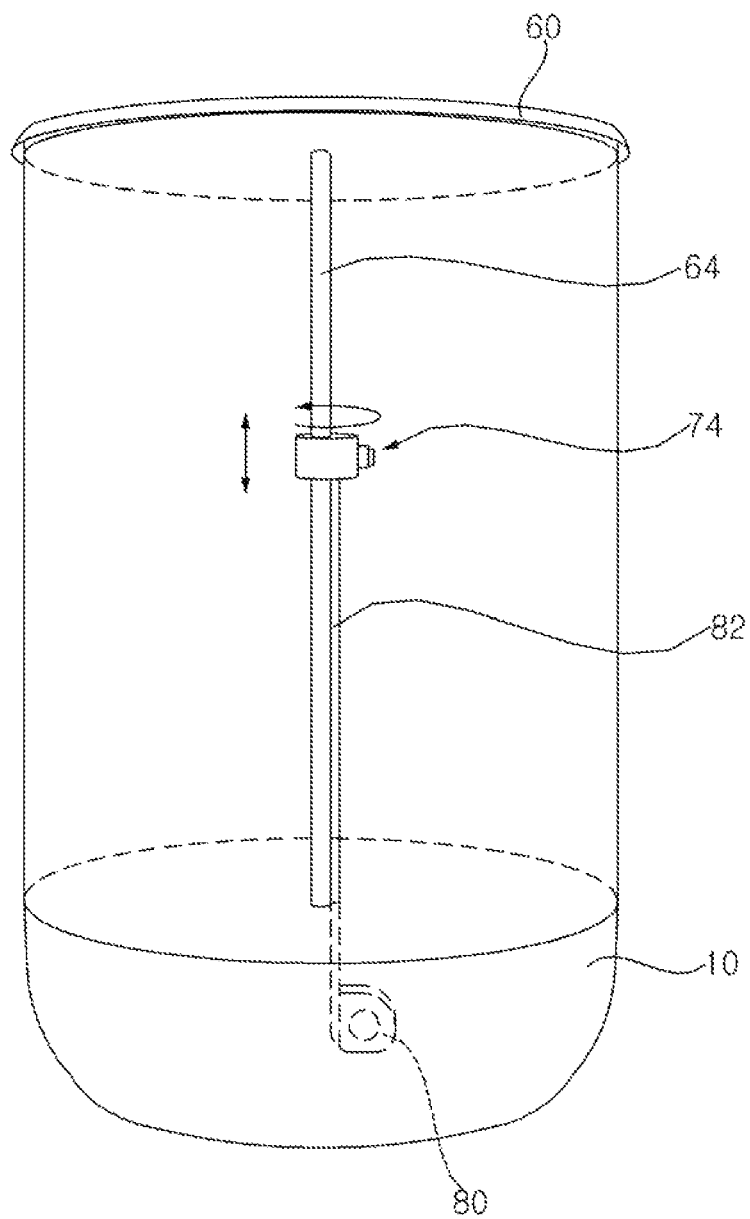
FIG. 4 is a side view illustrating a lighting bar and an image capture unit according to an embodiment of the present disclosure.
Figure 5:
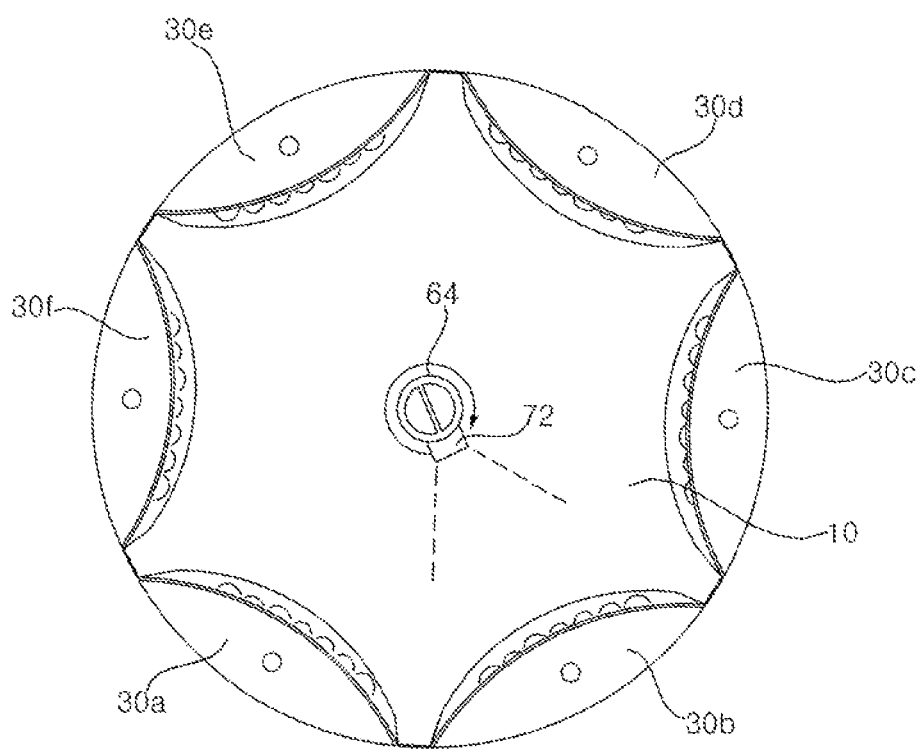
FIG. 5 is a plan view illustrating the lighting bar and the image capture unit according to the embodiment of the present disclosure.

FIG. 4 is a side view illustrating a lighting bar and an image capture unit according to an embodiment of the present disclosure, and FIG. 5 is a plan view illustrating the lighting bar and the image capture unit according to the embodiment of the present disclosure.

Hereinafter, the lighting bar 64 and the image capture unit 72 will be described with reference to FIGS. 4 and 5.

The lighting bar 64 has a cylindrical shape and is disposed between the upper cover 60 and the base 10. The lighting bar 64 may include a plurality of LED lights. The plurality of LED lights is disposed 360 degrees to emit light to the plurality of growing panels 30a, 30b, 30c, 30d, 30e, and 30f, disposed outside the circumference of the lighting bar 64. In addition, the plurality of LED lights is disposed in an upward-downward direction in order to emit light to each of the growing holders 36 disposed upwards and downwards at each of the plurality of growing panels 30a, 30b, 30c, 30d, 30e, and 30f, disposed outside the circumference of the lighting bar 64.

An upward-downward movement rail configured to guide upward-downward movement of the image capture unit 72 is disposed at one side of the lighting bar 64. The image capture unit 72 may move along the upward-downward movement rail in the upward-downward direction.

The image capture unit 72 is disposed around the lighting bar 64. The image capture unit 72 is disposed so as to be movable along the lighting bar 64 in the upward-downward direction. The image capture unit 72 is configured to capture images of the states of plants mounted to the plurality of growing panels 30a, 30b, 30c, 30d, 30e, and 30f.

The image capture unit 72 may capture images of the states of plants disposed at the growing panels disposed outside the lighting bar 64 so as to be spaced apart from each other.

The image capture unit 72 (i.e., camera) includes a camera sensor 74, an upward-downward movement unit configured to move the camera sensor 74 in the upward-downward direction, and a rotation unit configured to rotate the camera sensor 74 360 degrees in a direction perpendicular to the direction in which the upward-downward movement unit moves.

The camera sensor 74 is disposed to capture images of each of the plurality of growing panels 30a, 30b, 30c, 30d, 30e, and 30f. The camera sensor 74 is disposed at one side of the rotation unit. The rotation unit is rotatable 360 degrees. Consequently, it is possible to capture images of the states of plants disposed at each of the plurality of growing panels 30a, 30b, 30c, 30d, 30e, and 30f.

Figure 6:
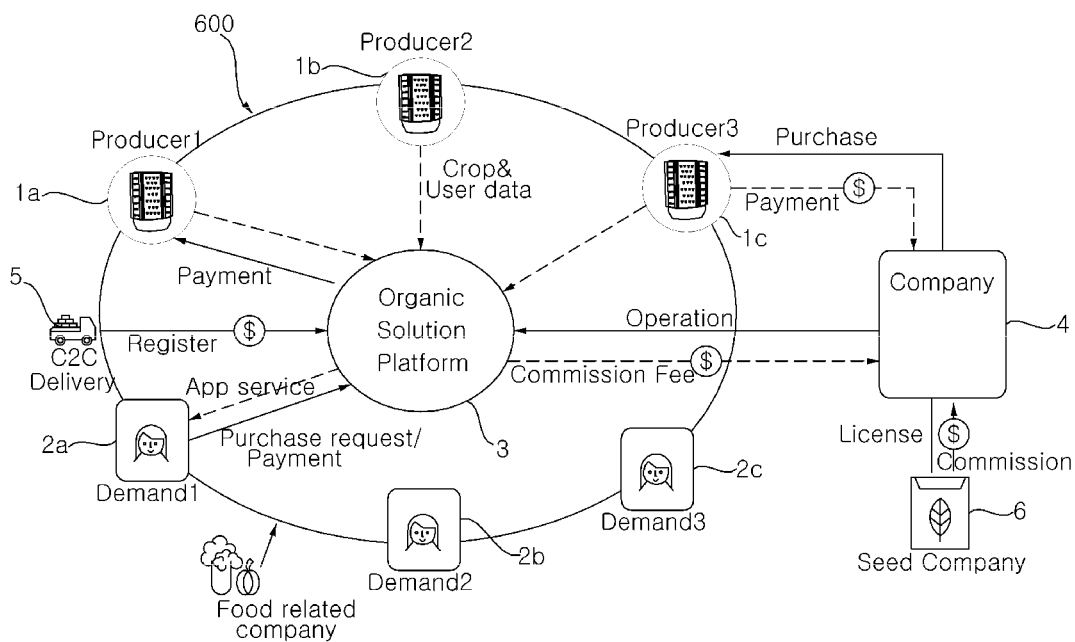
FIG. 6 is a conceptual view of a smart farm platform according to an embodiment of the present disclosure.

FIG. 6 is a conceptual view of a smart farm platform according to an embodiment of the present disclosure.

FIG. 6 exemplarily shows the case in which a producer uses the plant grower 1 described with reference to FIGS. 1 to 5. Alternatively, another kind of plant grower may be used.

Referring to FIGS. 1 to 6, the smart farm platform 600 according to the embodiment of the present disclosure may include a plant grower 1 configured to produce agricultural products, a business platform 3 (i.e., "Organic Solution Platform") configured to receive the agricultural products and information about the plant grower 1 from the plant grower 1, and a terminal 1a, 1b, 1c, 2a, 2b, or 2c connected to the business platform 3, the terminal being configured to request predetermined information related to the agricultural products and to display a screen based on a reply received from the business platform 3 in response to the request through a display.

The terminal 1a, 1b, 1c, 2a, 2b, or 2c may include a cellular phone, a smartphone, a personal digital assistant (PDA), a portable multimedia player (PMP), a tablet, a computer, or a multimedia device of a user who uses the business platform 3.

The user may manipulate the terminal 1a, 1b, 1c, 2a, 2b, or 2c in order to access the business platform 3 over a wired/wireless network and to use various kinds of information and services.

The business platform 3 according to the embodiment of the present disclosure may be used by both a producer who uses the plant grower 1 and a consumer who purchases the agricultural products. In addition, a producer may also be a consumer when purchasing agricultural products that are not produced by the producer.

The business platform 3 may provide various kinds of information about and services related to the agricultural products and the plant grower 1 in the form of an application (APP) or a website. A producer (or a seller who is entrusted with sales by a producer or who purchases agricultural products from a producer and sells the purchased agricultural products) may use a service of the business platform 3 using a producer-side terminal 1a, 1b, or 1c. In addition, a consumer may also use a service of the business platform 3 using a consumer-side terminal 2a, 2b, or 2c.

The business platform 3, which provides various kinds of information and services on the agricultural products and the plant grower 1, may include one or more servers. The business platform 3 may be a server operated by a manufacturer 4 of the plant grower 1, a server operated by a service provider, or a cloud server.

Meanwhile, the manufacturer 4 (i.e., "Company") of the plant grower 1 may receive purchase prices or rental fees from first to third producers Producer1, Producer2, and Producer3 who purchased or rent the plant grower 1.

In addition, the manufacturer 4 of the plant grower 1 may receive charges from users while operating the business platform 3. Alternatively, the manufacturer 4 of the plant grower 1 may operate the business platform 3 free of charge for public good.

Depending on embodiments, the business platform 3 may be used to deal with organic agricultural products. The business platform 3 may offer, purchase, distribute, and sell organic agricultural products produced based on the plant grower 1.

Depending on embodiments, the business platform 3 may interconnect a producer and a consumer within a local area. As a result, agricultural products produced in a local area may be consumed and delivered only in the local area, whereby it is possible to maximally prevent generation of agricultural product waste, to reduce necessity for storing the agricultural products, and to reduce the amount of carbon dioxide and expenses generated during delivery.

Meanwhile, the business platform 3 may receive purchase prices from first to third consumers Demand1, Demand2, and Demand3 who purchased agricultural products through the business platform 3.

In addition, various third parties may participate in the smart farm platform 600 according to the embodiment of the present disclosure. For example, a delivery company 5 or a food-related company 7 may use the business platform 3.

Meanwhile, a seed company 6 may supply seeds for the plant grower 1 to the manufacturer 4 of the plant grower 1 while paying a predetermined fee to the manufacturer 4 of the plant grower 1. In addition, the seed company 6 may also use the business platform 3.

Meanwhile, the plant grower 1 may periodically transmit various kinds of information to the business platform 3. Alternatively, the plant grower 1 may transmit various kinds of information to the business platform 3 when a predetermined event occurs. Alternatively, the plant grower 1 may transmit various kinds of information to the business platform 3 in the case in which predetermined conditions are satisfied.

The plant grower 1 may transmit state information of agricultural products that are being grown and operation history information of the plant grower 1 to the business platform 3.

For example, the plant grower 1 may transmit the kind, number, disposition, and other growth information of agricultural products that are being grown to the business platform 3.

In addition, the plant grower 1 may acquire images of agricultural products that are being grown and transmit image data to the business platform 3.

In addition, the plant grower 1 may transmit information about the amounts of water and electricity that were used by the plant grower 1, information about the amount of fertilizer that was introduced into plant grower 1, and sensing data sensed by various kinds of sensors to the business platform 3.

In addition, the plant grower 1 may transmit information about when and how many times a producer used a specific function of the plant grower 1 to the business platform 3.

Meanwhile, the business platform 3 may decide recommended selling prices of the agricultural products based on the state information of the agricultural products and the operation history information of the plant grower 1, among the information received from the plant grower 1.

The business platform 3 may transmit information about the recommended selling prices of the agricultural products to the terminal 1a, 1b, 1c, 2a, 2b, or 2c. The terminal 1a, 1b, 1c, 2a, 2b, or 2c may display the recommended selling prices of the agricultural products through the display.

According to the embodiment of the present disclosure, it is possible for a producer who farms on a small scale to share farm crops with neighbors and to sell the surplus farm crops in order to make a profit using the plant grower 1.

Since agricultural product waste and food waste cause various social and environmental problems, a solution to minimize generation of waste is needed.

The smart farm platform 600 according to the embodiment of the present disclosure is capable of collecting information using the plant grower and recommending or automatically deciding prices based on the collected information.

According to the embodiment of the present disclosure, prices of agricultural products of producers to be sold are automatically appropriately recommended or decided, whereby it is possible to further activate use of the smart farm platform 600 and consumption of the agricultural products of producers and to minimize waster of residual agricultural products.

Depending on embodiments, the business platform 3 may decide the recommended selling prices based on production costs input through the producer-side terminal 1a, 1b, or 1c of the producer who uses the plant grower 1. That is, at the time of price calculation, the business platform 3 may decide the recommended selling prices based on costs that the producer Producer1, Producer2, or Producer3 directly input through the producer-side terminal 1a, 1b, or 1c.

Alternatively, the business platform 3 may decide the recommended selling prices based on production costs calculated based on the operation history information of the plant grower 1. That is, at the time of price calculation, the business platform 3 may automatically decide the recommended selling prices based on the operation history information of the plant grower 1 without input of the producer Producer1, Producer2, or Producer3. For example, the business platform 3 may calculate production costs based on the amounts of water and electricity that were used by the plant grower 1 and the amount of fertilizer that was introduced into the plant grower 1, and may decide the recommended selling prices based on the calculated production costs.

The business platform 3 may calculate the production costs based on information about at least one of the amounts of water, electricity, and supplies that were used by the plant grower 1. In addition, the business platform 3 may calculate the production costs in overall consideration of water, fertilizer, electricity, and supplies that were used by the plant grower 1.

Meanwhile, the business platform 3 may include personnel expenses calculated based on the manipulation history information of the plant grower 1 and sensing data of the plant grower 1 in the production costs. For example, the business platform 3 may calculate work time of the producer Producer1, Producer2, or Producer3 based on the manipulation history of a main body of the plant grower 1 and sensing data acquired by a human body sensor included in the plant grower 1, and may calculate personnel expenses based on the calculated work time.

Consequently, the business platform 3 according to the embodiment of the present disclosure is capable of reflecting personnel expenses in prices, whereby it is possible to more appropriately set prices.

Meanwhile, the business platform 3 may evaluate the states of the agricultural products based on the image data of the agricultural products received from the plant grower 1, and may provide information about the states of the agricultural products to the terminal 1a, 1b, 1c, 2a, 2b, or 2c.

That is, the business platform 3 may evaluate the states of the agricultural products based on the image data of the agricultural products received from the plant grower 1, and the terminal 1a, 1b, 1c, 2a, 2b, or 2c may display the result of evaluation.

Consequently, it is possible for both the producer Producer1, Producer2, or Producer3 and the consumer Demand1, Demand2, or Demand3 to directly view the current images of the agricultural products and to confirm image-based evaluation data.

Meanwhile, the business platform 3 may decide the recommended selling prices based on the result of image-based evaluation and the calculated production costs. For example, the business platform 3 may suggest prices different in grades by grading the agricultural products based on images and reflecting grades of the agricultural products in the production costs.

Meanwhile, the business platform 3 may decide the recommended selling prices based on the amount of production of the agricultural products collected from the producer-side terminals 1a, 1b, and 1c and the level of demand for the agricultural products collected from the consumer-side terminals 2a, 2b, and 2c.

That is, the business platform 3 may primarily decide prices in terms of cost, and may recommend adjusted prices in consideration of the level of demand.

The business platform 3 may receive information from the plant growers 1 of the plurality of producers Producer1, Producer2, and Producer3, and may analyze the received information. Consequently, it is possible to know the kind and the harvest timing of agricultural products to be produced by the plant growers 1, whereby it is possible to estimate the amount of supply of specific agricultural products. Depending on embodiments, the business platform 3 may acquire amount-of-supply information from the outside over a wired/wireless network.

Meanwhile, upon receiving the final input of the recommended selling prices through the producer-side terminal 1a, 1b, or 1c of the producer who uses the plant grower 1, the business platform 3 may register the prices corresponding to the final input as selling prices of the agricultural products.

Meanwhile, in the case in which the terminal 1a, 1b, 1c, 2a, 2b, or 2c is the consumer-side terminal 2a, 2b, or 2c of the consumer who purchases the agricultural products, the displayed recommended selling prices may be the selling prices of the agricultural products.

Depending on embodiments, the seller may set the recommended selling prices suggested by the business platform 3 as the minimum prices. In this case, the final prices may be decided by reflecting the amount of production and the level of demand in a price range equal to or higher than the recommended selling prices. Upon determining that it is difficult to select prices equal to or higher than the minimum prices, the business platform 3 may transmit an alarm signal to the producer-side terminal 1a, 1b, or 1c.

Meanwhile, the business platform 3 may decide the recommended selling prices based on the amount of production of the agricultural products collected from the producer-side terminals in a local area and the level of demand for the agricultural products collected from the consumer-side terminals in the local area.

Depending on embodiments, the business platform 3 may interconnect a producer and a consumer within a local area. As a result, agricultural products produced in a local area may be consumed and delivered only in the local area, whereby it is possible to maximally prevent generation of agricultural product waste, to reduce necessity for storing the agricultural products, and to reduce the amount of carbon dioxide and expenses generated during delivery.

Meanwhile, upon receiving a purchase request for a specific agricultural product from the consumer-side terminal 2a, 2b, or 2c, the business platform 3 may provide information about a delivery path from a seller of the specific agricultural product to a consumer who purchases the agricultural product to the consumer-side terminal 2a, 2b, or 2c. As a result, the consumer may confirm expected delivery time and path.

Meanwhile, the business platform 3 may predict the growth states of the agricultural products based on image data of the agricultural products received from the plant grower 1.

Based on image data of the agricultural products received from the plant grower 1, the business platform 3 may determine the current states of the agricultural products and may predict the harvest timing, the amount of production, and grades of the agricultural products.

It is difficult for an inexperienced producer to predict the growth states of agricultural products that are being grown. According to the embodiment of the present disclosure, however, it is possible for even an inexperienced producer to confirm information about the predicted growth states of the agricultural products to thus make a growth plan.

Meanwhile, the business platform 3 may predict the maximum amount of production of the agricultural products and the minimum amount of production of the agricultural products based on the predicted growth state, and may provide information about the predicted maximum amount of production and the predicted minimum amount of production to the terminal 1a, 1b, 1c, 2a, 2b, or 2c.

In the case of individual growth, a large amount of agricultural products may become waste if production variation is great and the amount of production is excessively increased. According to the embodiment of the present disclosure, however, it is possible for even an inexperienced producer to confirm information about the predicted growth states of the agricultural products and to systematically grow the agricultural products or to induce consumption of surplus agricultural products through low price setting, whereby it is possible to minimize generation of waste.

Meanwhile, in the case in which the agricultural products are agricultural products before harvesting, the business platform 3 may predict the harvest timing of the agricultural products based on the predicted growth state, and may vary timing when a purchase request for the agricultural products is possible based on the predicted harvest timing.

That is, in the case in which purchase of agricultural products that have not yet been harvested is offered, timing when offer for purchase is possible may be adjusted based on the predicted harvest timing, which may assist a consumer in confirming data related to the agricultural products at desired timing and deciding purchase and which may assist a producer in performing sale-related activities only at specific timing or establishing a growth plan.

Meanwhile, the business platform 3 may provide recipe information using the agricultural products based on the predicted growth state. In particular, the business platform 3 may widely announce recipe information using agricultural products expected to be excessively produced in order to increase consumption of excessively produced agricultural products, whereby it is possible to minimize generation of waste.

Meanwhile, the business platform 3 may recommend a predetermined cultivar based on at least one of location information of the plant grower 1, operation history information of the plant grower 1, and demand information of agricultural products. As a result, it is possible for producers to establish growth plans based on supply and/or demand prediction.

In addition, the business platform 3 may recommend the predetermined cultivar based on specific cultivar growth information and specific cultivar demand information in a local area from the plant grower 1, whereby it is possible to establish a growth plan in consideration of a growth plan in an area in the vicinity of the plant grower 1. In addition, the business platform 3 may recommend growth of a specific cultivar to a producer at a place having the smallest delivery distance based on location information of a consumer who frequently buys the specific cultivar. Consequently, the business platform 3 may interconnect a producer and a consumer in a specific area.

As described with reference to FIGS. 1 to 5, the disposition of the growing panels 30a, 30b, 30c, 30d, 30e, and 30f of the plant grower 1 may be varied.

The disposition form of the growing panels 30a, 30b, 30c, 30d, 30e, and 30f of the plant grower 1 in a day mode and the disposition form of the growing panels 30a, 30b, 30c, 30d, 30e, and 30f of the plant grower 1 in a night mode may be different from each other. That is, the plant grower 1 may have the disposition form of FIG. 1 in the day mode, and may have the disposition form of FIG. 2 in the night mode.

In the night mode, the growing panels 30a, 30b, 30c, 30d, 30e, and 30f may be disposed so as to face the interior of the plant grower 1. At this time, the lighting bar 64 and the camera sensor 74 in the plant grower 1 may be operated.

In the day mode, the surfaces of the growing panels at which the growing holders 36 are disposed may be disposed so as to face the exterior of the plant grower 1. In the day mode, therefore, plants may be exposed to natural light.

In the night mode, the surfaces of the growing panels at which the growing holders 36 are disposed may be disposed so as to face the interior of the plant grower 1. In the night mode, therefore, plants may be exposed to light emitted by the lighting bar 64.

Consequently, the plant grower 1 according to the present disclosure is capable of growing plants day and night using natural light from the sun and light from the lighting bar 64, whereby it is possible to increase the growth speed of the plants.

Also, in the night mode, images of the plants may be captured by the camera sensor 74 in a uniformly bright situation based on light from the lighting bar 64, whereby it is possible to acquire high-quality images. That is, the lighting bar 64 may project light in a uniform manner towards the plants of the plant grower 1 to allow for the camera to take improved images of the plants.

In addition, images are acquired in a uniform environment, which is advantageous in determining the states of plants based on images.

Figure 7:
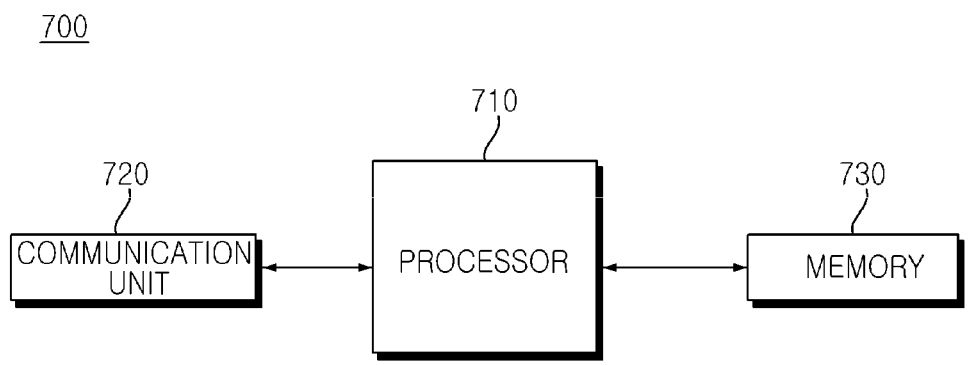
FIG. 7 is a schematic inner block diagram of a smart farm platform server according to an embodiment of the present disclosure.

FIG. 7 is a schematic inner block diagram of a smart farm platform server according to an embodiment of the present disclosure, which shows an example of a server configured to provide a service of the smart farm platform.

Referring to FIG. 7, the server 700 may include a communication unit 720 (i.e., communicator), a processor 710 (e.g., CPU, controller), and a memory 730.

The processor 710 may control overall operation of the server 700.

The processor 710 is loaded with an artificial neural network (ANN) trained through machine learning. Consequently, the processor 710 may perform agricultural product recognition, recommenced price calculation, and growth information determination based on images. The artificial neural network (ANN) may be embodied in the form of software or hardware, such as a chip.

For example, the processor 710 may include a deep neural network (DNN) trained through deep learning, such as a convolutional neural network (CNN), a recurrent neural network (RNN), or a deep belief network (DBN).

Meanwhile, the server 700 may be a server operated by a manufacturer of the plant grower 1, a server operated by a service provided, or a cloud server.

The communication unit 720 may receive various kinds of data, such as state information, operation information, and manipulation information, from the plant grower 1, the terminal 1a, 1b, 1c, 2a, 2b, or 2c, a gateway, or another electronic device.

The communication unit 720 may transmit data corresponding to the received various kinds of information to the plant grower 1, the terminal 1a, 1b, 1c, 2a, 2b, or 2c, the gateway, or the other electronic device.

To this end, the communication unit 720 may include at least one communication module, such as an Internet module or a mobile communication module.

The memory 730 may store received information, and may have data necessary to generate result information corresponding thereto.

In addition, the memory 730 may store data used in machine learning, result data, etc.

The memory 730 may store data necessary to operate the server 700.

For example, the memory 730 may store a learning algorithm that is executed by the server 700. The learning algorithm may be a learning algorithm based on a deep neural network, as shown in FIG. 8.

Figure 8:
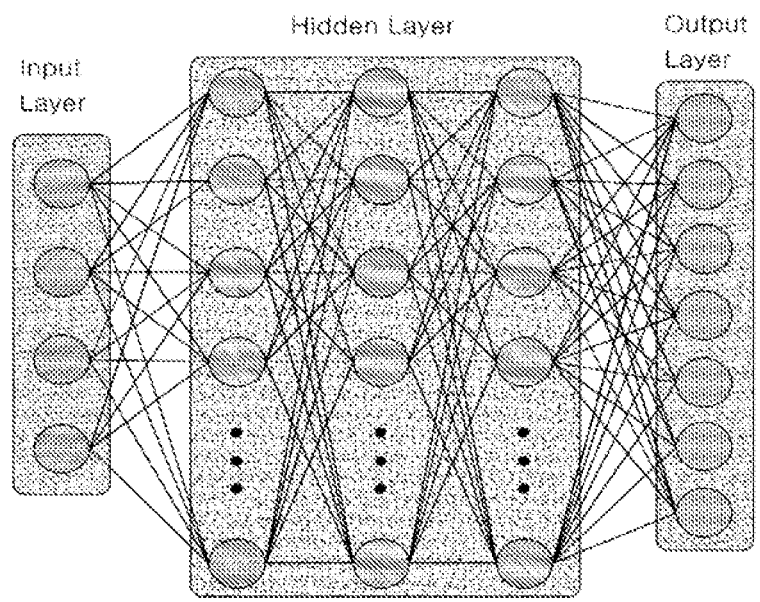
FIG. 8 is a reference view illustrating deep learning.

Referring to FIG. 8, deep learning, which is a kind of machine learning, may perform learning to a deep level in multiple stages based on data.

Deep learning may be a set of machine learning algorithms that extract core data from plural data via hidden layers in turn.

A deep learning structure may be constituted by a deep neural network (DNN), such as a convolutional neural network (CNN), a recurrent neural network (RNN), or a deep belief network (DBN).

The deep neural network (DNN) may include an input layer, a hidden layer, and an output layer.

Meanwhile, the deep neural network (DNN) may have multiple hidden layers.

Each layer may include a plurality of nodes. Each layer is connected to the next layer. The nodes may have weights and may be connected to each other.

An output from an arbitrary node belonging to a first hidden layer becomes an input of at least one node belonging to a second hidden layer. At this time, an input of each node may be a value obtained by applying a weight to the output of the node of the previous layer. The weight may mean intensity of connection between nodes. A deep learning process may be a process of finding an appropriate weight.

Meanwhile, the artificial neural network may be trained by adjusting a weight of a connection line between nodes (if necessary, by also adjusting a bias value) such that a desired output is obtained from a given input. In addition, the artificial neural network may continuously update the weight value through training.

Figure 9:
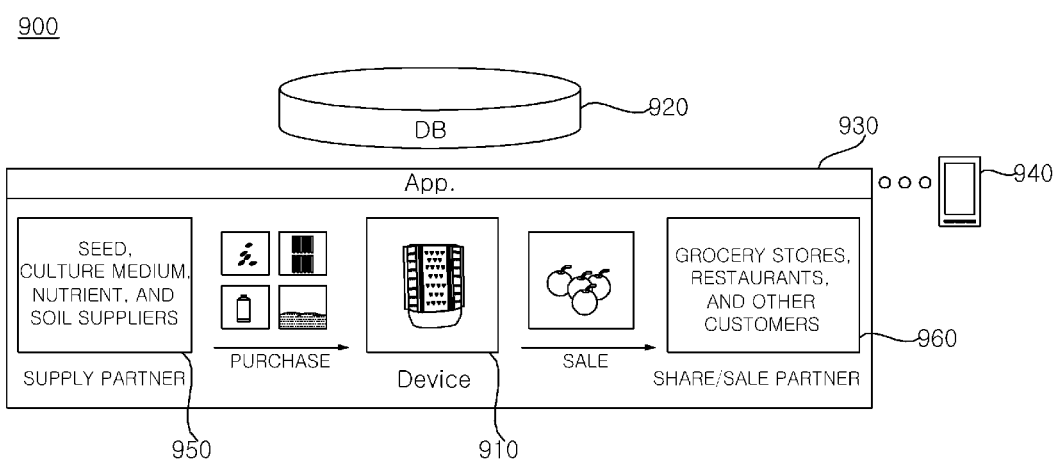
FIG. 9 is a conceptual view of a smart farm platform according to an embodiment of the present disclosure.

FIG. 9 is a conceptual view of a smart farm platform according to an embodiment of the present disclosure.

Referring to FIG. 9, a business platform 3 may provide various kinds of information about and services related to agricultural products and a plant grower 910 in the form of an application (APP) 930.

A producer (or a seller who is entrusted with sales by a producer or who purchases agricultural products from a producer and sells the purchased agricultural products) and a consumer may use a service of the business platform 3 using a consumer-side terminal 940.

The smart farm platform 900 may include a supply partner 950 and a share/sale partner 960. The supply partner 950 may include culture medium, nutrient, and soil suppliers. The share/sale partner 960 may include grocery stores, restaurants, and individual purchasers.

The culture medium, nutrient, and soil purchased from the supply partner 950 are necessary for the plant grower 910 to grow plants. In addition, surplus agricultural products, among agricultural products grown by the plant grower 910, may be sold to the share/sale partner 960.

Referring to FIG. 9, a database 920 of a server 700 included in the business platform 3 may store data related to the application 930 provided by the business platform 3.

For example, the database 920 may store data received from the plant grower 910 and secondary data based on the data received from the plant grower 910. Here, the secondary data may include production data, recognition data, analysis data, and learning data calculated based on the data received from the plant grower 910.

In addition, the database 920 may also store activity information of the supply partner 950 and the share/sale partner 960.

According to at least one of the embodiments of the present disclosure, it is possible to provide a smart farm platform capable of interconnecting a producer who grows agricultural products and a consumer, the smart farm platform being convenient for both the producer and the consumer to use, and an operation method thereof.

In addition, according to at least one of the embodiments of the present disclosure, it is possible to automatically recommend or decide agricultural product information using information collected by a plant grower.

In addition, according to at least one of the embodiments of the present disclosure, it is possible to variously use information collected by the plant grower.

In addition, according to at least one of the embodiments of the present disclosure, it is possible to provide a smart farm platform capable of minimizing generation of agricultural product waste and food waste and an operation method thereof.

A smart farm platform according to the present disclosure and an operation method thereof are not limited to the construction and operation disclosed in the embodiments as described above. All or some of the embodiments may be selectively combined to provide various modifications.

Meanwhile, an operation method of a smart farm platform according to an embodiment of the present disclosure may be implemented in a recording medium readable by a processor as processor-readable code. The processor-readable recording medium may include all types of recording units in which processor-readable data are stored. For example, the processor-readable recording medium may include a ROM, a RAM, a CD-ROM, a magnetic tape, a floppy disk, and an optical data storage device. The processor-readable recording medium may also be implemented in the form of a carrier wave such as transmission over the Internet. Also, the processor-readable recording medium may be distributed to networked computer systems and processor-readable code may be stored and executed in the computer systems in a distributed manner.

It will be apparent that, although the preferred embodiments have been shown and described above, the present disclosure is not limited to the above-described specific embodiments, and various modifications and variations can be made by those skilled in the art without departing from the gist of the appended claims. Thus, it is intended that the modifications and variations should not be understood independently of the technical spirit or prospect of the present disclosure.

What is claimed is:

1. A smart farm platform, comprising:
a plant grower configured to produce agricultural products, the plant grower including:
   a base;
   a plurality of growing panels disposed vertically along a circumference of the base, the plurality of growing panels being configured to receive agricultural products;
   an upper cover disposed on the plurality of growing panels;
   a lighting bar extending vertically between the base and the upper cover, the lighting bar being configured to emit light toward the plurality of growing panels disposed outside a circumference of the lighting bar; and
   a camera movable along the lighting bar, the camera being configured to capture images of the agricultural products;
a business platform configured to receive information about the agricultural products and the plant grower from the plant grower; and
a terminal connected to the business platform and including a display, the terminal being configured to:
   request, from the business platform, recommended selling prices of the agricultural products, and
   display, on the display, the recommended selling prices of the agricultural products,
wherein the plurality of growing panels are rotatable between a first position in a day mode and a second position in a night mode,
wherein, in the first position, the plurality of growing panels face outside of the plant grower, and
wherein, in the second position, the plurality of growing panels are disposed to face an interior of the plant grower, and the lighting bar and the camera are operated.

2. The smart farm platform of claim 1,
wherein the display of the terminal is configured to display a result of an evaluation of state of the agricultural products.

3. The smart farm platform of claim 1, wherein the lighting bar extends vertically upwards from a center of an upper surface of the base to the upper cover.

* * * * *